(12) United States Patent
Kimura

(10) Patent No.: US 10,486,097 B2
(45) Date of Patent: Nov. 26, 2019

(54) INTAKE SYSTEM COMPONENT

(71) Applicant: TOYOTA BOSHOKU KABUSHIKI KAISHA, Aichi-ken (JP)

(72) Inventor: Ryusuke Kimura, Ichinomiya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 188 days.

(21) Appl. No.: 15/717,278

(22) Filed: Sep. 27, 2017

(65) Prior Publication Data

US 2018/0099243 A1 Apr. 12, 2018

(30) Foreign Application Priority Data

Oct. 11, 2016 (JP) .................................. 2016-200119

(51) Int. Cl.
*B01D 53/02* (2006.01)
*B01D 53/04* (2006.01)
(Continued)

(52) U.S. Cl.
CPC ... *B01D 53/0407* (2013.01); *F02M 35/10242* (2013.01); *F02M 35/10334* (2013.01);
(Continued)

(58) Field of Classification Search
CPC ...... B01D 2253/102; B01D 2259/4516; B01D 53/0407; F02M 35/10242; F02M 35/10334; F02M 35/1272
See application file for complete search history.

(56) References Cited

U.S. PATENT DOCUMENTS 6,692,555 B2 * 2/2004 Oda .................... B01D 46/0023
123/198 E
7,344,586 B2 * 3/2008 Zulauf .................... B01D 53/02
95/143
(Continued)

FOREIGN PATENT DOCUMENTS

CN 101052455 10/2007
JP 2007-321600 12/2007
(Continued)

OTHER PUBLICATIONS

Chinese Office Action in Chinese counterpart application No. 201710891092.0, dated Jun. 21, 2019 along with English-language translation.

*Primary Examiner* — Christopher P Jones
(74) *Attorney, Agent, or Firm* — Greenblum & Bernstein, P.L.C.

(57) ABSTRACT

An intake system component includes a side wall and a holding sheet arranged on an inner surface of the side wall. The side wall is formed by a fibrous body including base material fibers and binder fibers that bond together the base material fibers. The binder fibers have a lower melting point than the base material fibers. The holding sheet is formed in the same manner as the side wall by a fibrous body including the base material fibers and the binder fibers that bond together the base material fibers. The binder fibers have a lower melting point than the base material fibers. The holding sheet includes a holding portion and a joined portion. The holding portion holds an adsorbent that adsorbs a fuel component. The joined portion is located around the holding portion and joined with the inner surface of the side wall by the binder fibers.

5 Claims, 4 Drawing Sheets

(51) Int. Cl.
*F02M 35/10* (2006.01)
*F02M 35/12* (2006.01)

(52) U.S. Cl.
CPC .................. *B01D 2253/102* (2013.01); *B01D 2259/4516* (2013.01); *F02M 35/1272* (2013.01)

(56) References Cited

U.S. PATENT DOCUMENTS

| | | | |
|---|---|---|---|
| 8,082,906 B2* | 12/2011 | Hirata | B01D 53/0431 |
| | | | 123/184.21 |
| 2007/0278034 A1* | 12/2007 | Yamaura | F02M 35/02 |
| | | | 181/229 |
| 2008/0134898 A1* | 6/2008 | Uemura | B01D 46/0036 |
| | | | 96/134 |
| 2010/0089368 A1* | 4/2010 | Hirata | B01D 53/0431 |
| | | | D53/431 |
| 2011/0108008 A1* | 5/2011 | Hurley | B01D 53/02 |
| | | | 123/520 |

FOREIGN PATENT DOCUMENTS

| | | |
|---|---|---|
| JP | 2009-138668 | 6/2009 |
| WO | WO2006/049680 | 5/2006 |

* cited by examiner

INTAKE SYSTEM COMPONENT

BACKGROUND OF THE INVENTION

The present invention relates to an intake system component.

A vehicle such as an automobile includes an intake system component having side walls that form an intake passage connected to an internal combustion engine. One example of such an intake system component (for example, intake duct) functions to adsorb fuel components that have entered an intake system (intake passage) of the internal combustion engine when the engine is stopped.

For example, Japanese Laid-Open Patent Publication No. 2009-138668 (hereinafter referred to as document 1) describes a structure in which a tubular filter holding adsorbents that adsorb fuel components is concentrically arranged in an intake duct, and a gas passage around the filter in the intake duct is structured so that the gas in the intake duct passes through the filter from the inner side to the outer side or from the outer side to the inner side. When the fuel components in the intake passage pass through the filter, the fuel components are adsorbed by the adsorbents held in the filter.

Further, Japanese Laid-Open Patent Publication No. 2007-321600 (hereinafter referred to as document 2) describes a laminated sheet formed by stacking a plurality of breathable sheets in the thickness-wise direction and arranging adsorbents that adsorb fuel components between the sheets. In this state, the laminated sheet is entirely pressed in the thickness-wise direction to form side walls of an intake duct. In this case, when the fuel components in the intake passage reach the adsorbents located between the sheets, the intake system component is adsorbed by the adsorbents.

However, in document 1, the passage of the gas in the intake duct through the filter from the inner side to the outer side or from the outer side to the inner side results in a complicated filter supporting structure and a complicated gas passage structure around the filter in the intake duct. Thus, it becomes difficult to couple the filter (adsorbents) to the intake duct.

In document 2, the adsorbents only need to be arranged between the sheets when manufacturing the intake duct. Thus, the coupling of the adsorbents is not difficult. However, the pressing of the entire laminated sheet in the thickness-wise direction during the manufacturing of the intake duct may crush the adsorbents arranged between the sheets.

SUMMARY OF THE INVENTION

It is an object of the present invention to provide an intake system component that can be easily coupled without crushing the adsorbents.

To achieve the above object, an intake system component includes a side wall that forms an intake passage and a holding sheet arranged on an inner surface of the side wall. The side wall is formed by a fibrous body including base material fibers and binder fibers that bond together the base material fibers. The binder fibers have a lower melting point than the base material fibers. The holding sheet is formed in the same manner as the side wall by a fibrous body including the base material fibers and the binder fibers that bond together the base material fibers. The binder fibers have a lower melting point than the base material fibers. The holding sheet includes a holding portion and a joined portion. The holding portion holds an adsorbent that adsorbs a fuel component. The joined portion is located around the holding portion and joined with the inner surface of the side wall by the binder fibers.

In the above structure, the joined portion is located around the holding portion that holds the adsorbent in the holding sheet. The joined portion is thermally pressed with the inner surface of the side wall so that the molten binder fibers join the joined portion with the inner surface of the side wall. This facilitates the coupling of the adsorbent to the intake duct (side wall). Further, when the joined portion is joined with the inner surface of the side wall, the holding portion is not thermally pressed. This restricts the crushing of the adsorbent, which is held by the holding portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of an intake system component installed in a vehicle will now be described with reference to FIGS. 1 to 4.

Figure 1:
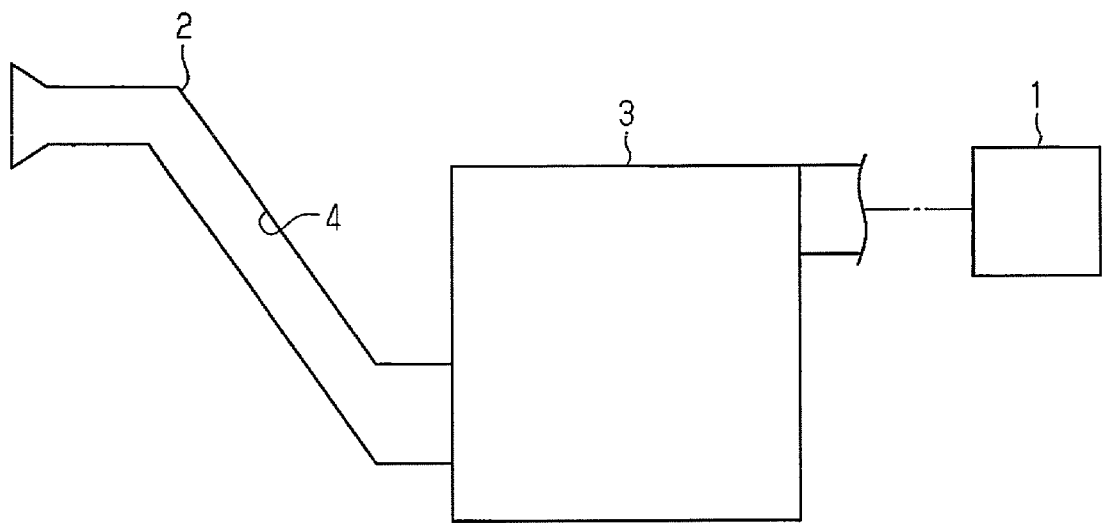
FIG. 1 is a diagram showing an intake system of an internal combustion engine in an engine compartment of a vehicle in a first embodiment.

FIG. 1 shows the overview of an intake system of an internal combustion engine 1 installed in an engine compartment of a vehicle. The intake system of the internal combustion engine 1 is formed by intake system components such as an intake duct 2 and an air cleaner 3. The intake system components form an intake passage 4 that draws air into the internal combustion engine 1. The intake duct 2 is arranged at an upstream side of the air cleaner 3 in the intake system of the internal combustion engine 1 and connected to the air cleaner 3.

Figure 2:
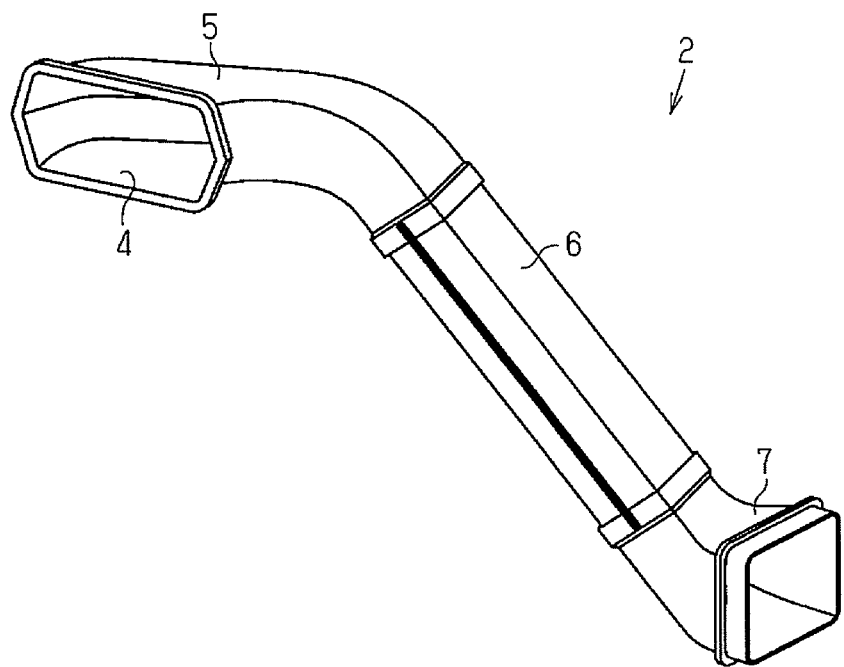
FIG. 2 is a perspective view showing an intake duct that forms the intake system of the internal combustion engine.

As shown in FIG. 2, the intake duct 2 includes a resin portion 5, a fibrous portion 6, and a resin portion 7 from an upstream side of the intake duct 2 toward a downstream side of the intake duct 2. The resin portion 5, the fibrous portion 6, and the resin portion 7 are connected to one another. The intake passage 4 extends through the inner sides of the resin portion 5, the fibrous portion 6, and the resin portion 7. The resin portion 5 and the resin portion 7 are formed from a resin. The fibrous portion 6 is formed by a material of which breathability has been adjusted such as fibers of nonwoven fabric in order to reduce the weight of the intake duct 2 and dampen intake noise.

Figure 3:
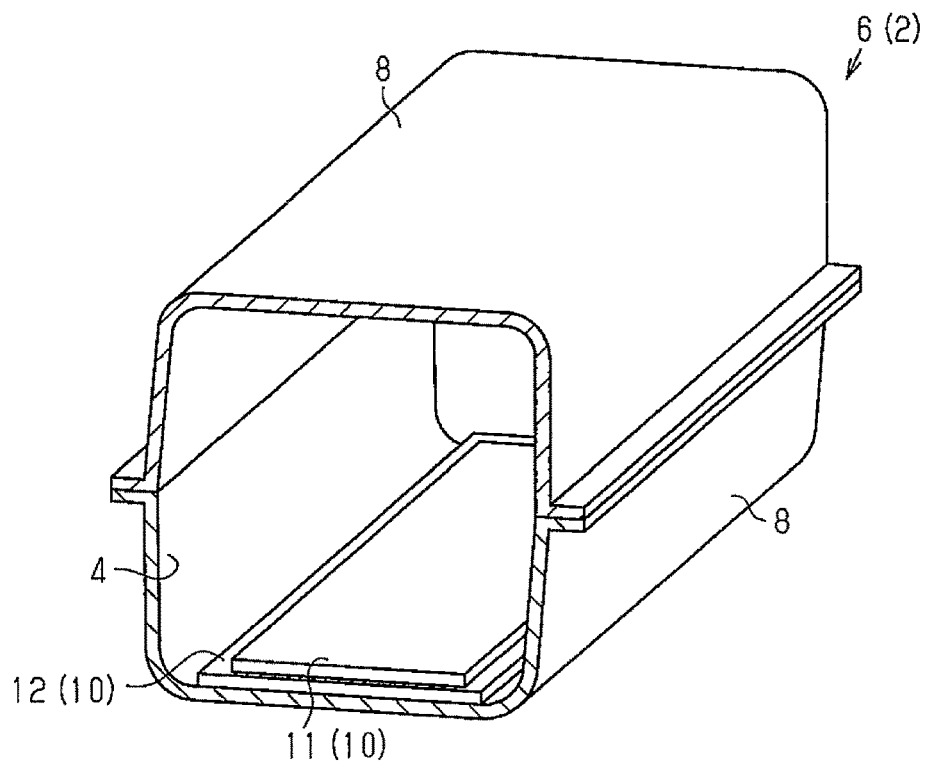
FIG. 3 is a perspective view showing the structure of a fibrous portion of the intake duct.

FIG. 3 shows a cross section of the fibrous portion 6 in a radial direction. The fibrous portion 6 includes two side walls 8, an upper one and a lower one, that form the intake passage 4. The side walls 8 are formed by a fibrous body including base material fibers and binder fibers. The base material fibers are bonded together by the binder fibers that have a lower melting point than the base material fibers. Base material fibers formed from polyethylene terephthalate (PET) and binder fibers formed from modified PET having a lower melting point than the PET of the base material fibers are used in the fibrous body.

The two edges of one of the side walls 8 in the radial direction of the fibrous portion 6 and the two edges of the other one of the side walls 8 in the radial direction of the fibrous portion 6 are thermally pressed so that the molten binder fibers join the edges. This forms the intake passage 4 between the side walls 8. Thus, the side walls 8 serve as side walls that are arranged in the radial direction of the intake passage 4 and joined together by the binder fibers.

Figure 4:
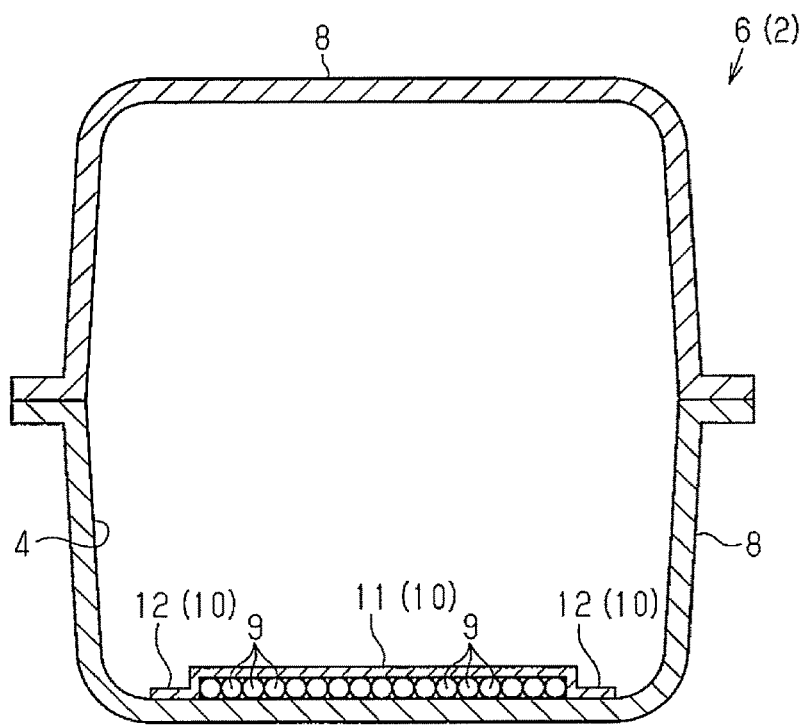
FIG. 4 is a cross-sectional view showing a cross section of the fibrous portion in a radial direction.

As shown in FIG. 4, adsorbents 9 (for example, activated carbon) and a holding sheet 10 are arranged on an inner surface (bottom surface) of the lower side wall 8 among the two upper and lower side walls 8. The adsorbents 9 adsorb fuel components that have entered the intake passage 4 when the internal combustion engine 1 is stopped. The holding sheet 10 holds the adsorbents 9. In the same manner as the side walls 8, the holding sheet 10 is formed by a fibrous body in which base material fibers are bonded together by binder fibers having a lower melting point than the base material fibers. Base material fibers formed from PET and binder fibers formed from modified PET having a lower melting point than the PET of the base material fibers are used in the fibrous body.

The holding sheet 10 includes a holding portion 11 and a joined portion 12. The holding portion 11 is upwardly recessed to hold the adsorbents 9 inside the holding portion 11. The joined portion 12 is located around the holding portion 11 and joined with the bottom surface of the side wall 8. The adsorbents 9 are adhered to the bottom surface of the side wall 8 by an adhesive. Further, the joined portion 12 of the holding sheet 10 is joined with the bottom surface of the side wall 8 so that the adsorbents 9 are pressed toward the bottom surface of the side wall 8 by the top surface of the holding portion 11. This holds the adsorbents 9 so that the adsorbents 9 do not move out of the holding portion 11. The joining of the joined portion 12 with the bottom surface of the side wall 8 is performed by thermally pressing the joined portion 12 and the bottom surface of the side wall 8 and using the molten binder fibers.

The operation of the intake duct 2 will now be described.

The weight of the intake duct 2 is reduced by forming the side walls 8 with the fibrous body. Further, when intake noise in the intake passage 4 strikes the side walls of the fibrous portion 6 in the intake duct 2, the fibers of the fibrous body forming the side walls 8 are slightly oscillated by the striking intake noise. This converts noise pressure energy of the intake noise into motion of the fibers that is consumed. Such energy consumption reduces the noise pressure.

In addition, the holding sheet 10 arranged on the bottom surface of the side wall 8 that forms the intake passage 4 is formed by the fibrous body. This allows fuel components to move between the fibers of the fibrous body. Thus, when the fuel components that have entered the intake passage 4 pass between the fibers of the holding sheet 10, the fuel components are adsorbed by the adsorbents 9, which are held by the holding portion 11 of the holding sheet 10.

The coupling of the holding sheet 10 (adsorbents 9) to the fibrous portion 6 is performed by thermally pressing the joined portion 12 of the holding sheet 10 with the bottom surface of the lower side wall 8 among the two side walls 8 in a state in which the two side walls 8 forming the fibrous portion 6 are separated from each other. When the joined portion 12 and the bottom surface of the side wall 8 are thermally pressed in this manner, the binder fibers melted by the thermal pressing join the joined portion 12 and the bottom surface of the side wall 8.

After joining the joined portion 12 with the bottom wall of the side wall 8, the fibrous portion 6 of the intake duct 2 is formed by thermally pressing the two edges of the upper side wall 8 in the radial direction of the fibrous portion 6 and the two edges of the lower side wall 8 in the radial direction of the fibrous portion 6. The molten binder fibers join the edges. This forms the fibrous portion 6 (intake duct 2) in which the holding sheet 10 (adsorbents 9) is coupled to the bottom surface of the side wall 8.

The present embodiment has the advantages described below.

(1) In the holding sheet 10, the joined portion 12 is located around the holding portion 11 that holds the adsorbents 9. When the joined portion 12 and the bottom surface of the side wall 8 are thermally pressed, the molten binder fibers join the joined portion 12 and the bottom surface of the side wall 8. This facilitates the coupling of the adsorbents 9 to the fibrous portion 6 (side wall 8) of the intake duct 2. Further, when the joined portion 12 is joined with the bottom surface of the side wall 8, the holding portion 11 is not thermally pressed. This restricts the crushing of the adsorbents 9, which are held by the holding portion 11.

(2) The coupling of the holding sheet 10 (adsorbents 9) to the bottom surface of the side wall 8 is performed in a state in which the two upper and lower side walls 8 forming the fibrous portion 6 are separated from each other. Subsequently, the binder fibers melted by the thermal pressing join the two upper and lower side walls 8. This forms the fibrous portion 6 (intake duct 2) in which the adsorbents 9 are coupled to the bottom surface of the side wall 8. Thus, the manufacturing of the intake duct 2 in which the adsorbents 9 are coupled to the fibrous portion 6 is facilitated.

Second Embodiment

A second embodiment of an intake system component will now be described with reference to FIG. 5.

Figure 5:
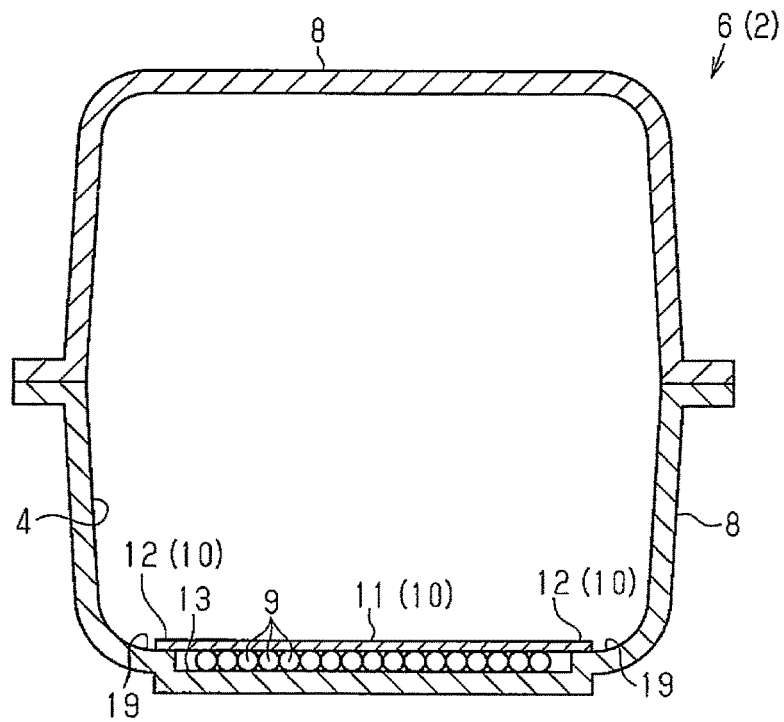
FIG. 5 is a cross-sectional view showing a cross section of the fibrous portion in the radial direction in a second embodiment.

As shown in FIG. 5, in the intake duct 2 of the present embodiment, the inner surface (bottom surface) of the lower side wall 8 among the two upper and lower side walls 8, which form the fibrous portion 6, includes a recess 13. The adsorbents 9 are located in the recess 13 and adhered to a bottom surface of the recess 13 by an adhesive. In the holding sheet 10, a surface of the holding portion 11 that opposes the intake passage 4 is coplanar with a surface of the joined portion 12 that opposes the intake passage 4. The inner surface of the side wall 8 includes the recess 13 and a peripheral portion 19 located around an opening of the recess 13. The joined portion 12 of the holding sheet 10 is joined with the peripheral portion 19. The joining presses the adsorbents 9 in the recess 13 with the holding portion 11 toward the bottom surface of the recess 13 and holds the adsorbents 9 so that the adsorbents 9 do not move out of the recess 13. In other words, the joined portion 12 is joined with the portion of the inner surface of the side wall 8

(peripheral portion 19) located around the opening of the recess 13 in a state in which the adsorbents 9 are held by the holding portion 11 and located in the recess 13.

In addition to the advantages of the first embodiment, the present embodiment has the advantages described below.

(3) When the joined portion 12 of the holding sheet 10 is joined with the inner surface of the side wall 8, the adsorbents 9 are held by the holding portion 11 of the holding sheet 10 and located in the recess 13 of the side wall 8. This limits the amount the holding portion 11 extends from the inner surface of the side wall 8 into the intake passage 4. Thus, increases are limited in the flow resistance of air in the intake passage 4 resulting from the extension of the holding portion 11 into the intake passage 4.

(4) In the holding sheet 10, if there is a step between the surface of the holding portion 11 that opposes the intake passage 4 and the surface of the joined portion 12 that opposes the intake passage 4, the step increases the flow resistance of the air flowing around the holding sheet 10 in the intake passage 4. However, the surface of the holding portion 11 that opposes the intake passage 4 is coplanar with the surface of the joined portion 12 that opposes the intake passage 4. Thus, the flow resistance of air is not increased by such a step.

Third Embodiment

A third embodiment of an intake system component will now be described with reference to FIGS. 6 and 7.

Figure 6:
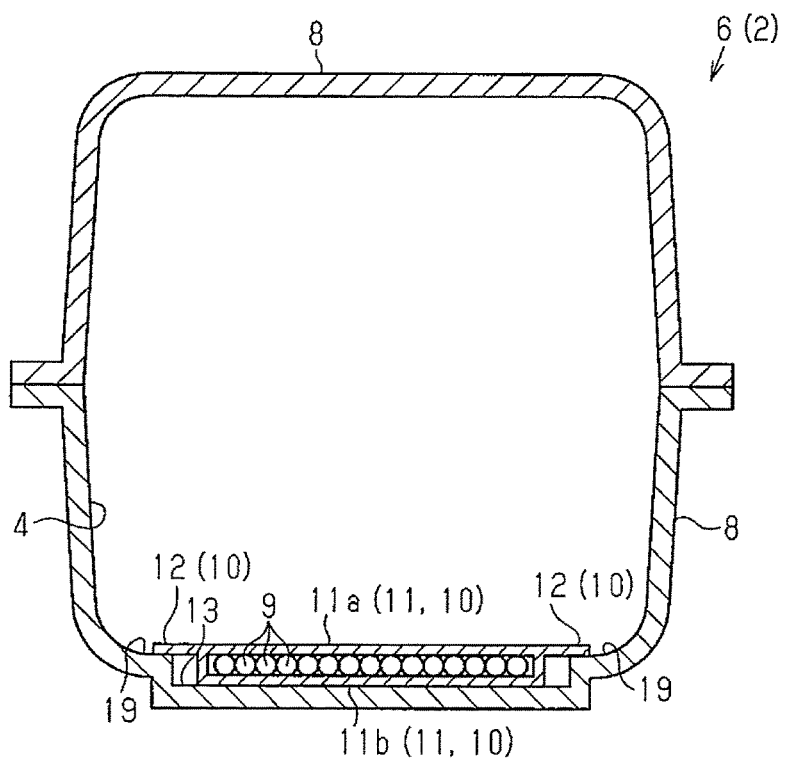
FIG. 6 is a cross-sectional view showing a cross section of the fibrous portion in the radial direction in a third embodiment.
Figure 7:
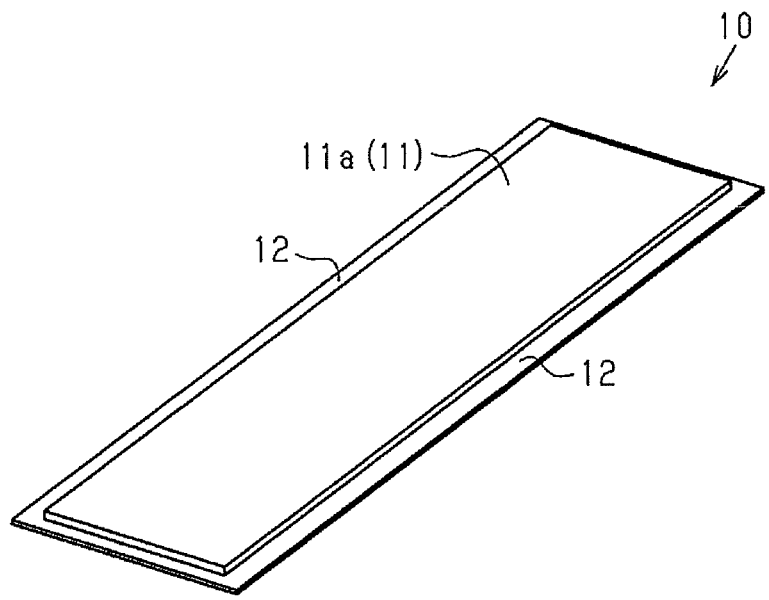
FIG. 7 is a perspective view showing a holding sheet.

FIGS. 6 and 7 respectively show a cross section of the fibrous portion 6 in the radial direction of the intake duct 2 of the present embodiment and a state of the holding sheet 10 arranged in the fibrous portion 6 as viewed from the diagonally upper side.

In the intake duct 2, the holding portion 11 of the holding sheet 10 includes a front surface sheet 11a and a rear surface sheet 11b that are adhered to each other in the vertical direction. The holding portion 11 holds the adsorbents 9 between the front surface sheet 11a and the rear surface sheet 11b. Further, the joined portion 12 is joined with the portion of the inner surface of the side wall 8 (peripheral portion 19) located around the opening of the recess 13 in a state in which the adsorbents 9 are held by the holding portion 11 and located in the recess 13 of the side wall 8.

In addition to the advantages of the first and second embodiments, the present embodiment has the advantage described below.

(5) The joined portion 12 of the holding sheet 10 can be joined with the inner surface of the side wall 8 in a state in which the adsorbents 9 are held between the front surface sheet 11a and the rear surface sheet 11b of the holding portion 11 of the holding sheet 10. This avoids separation of the adsorbents 9 from the holding portion 11 during the joining and facilitates the joining of the joined portion 12 of the holding sheet 10 with the inner surface of the side wall 8 while holding the adsorbents 9 on the holding portion 11.

Other Embodiments

It should be apparent to those skilled in the art that the present invention may be embodied in many other specific forms without departing from the spirit or scope of the invention. Particularly, it should be understood that the present invention may be embodied in the following forms.

Figure 8:
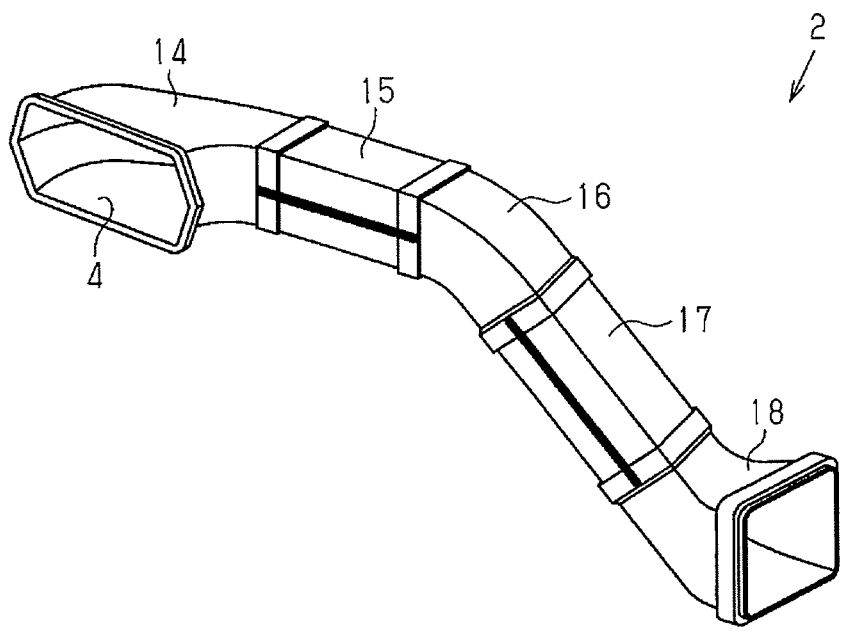
FIG. 8 is a perspective view showing another example of an intake duct.

As shown in FIG. 8, the number of resin portions and fibrous portions in the intake duct 2 may be changed. FIG. 8 shows an example in which a resin portion 14, a fibrous portion 15, a resin portion 16, a fibrous portion 17, and a resin portion 18 are arranged from the upstream side of the intake duct 2 toward the downstream side of the intake duct 2.

The holding sheet 10 of the third embodiment may be arranged on the side wall 8 that does not include the recess 13 like in the first embodiment. In this case, the joined portion 12 of the holding sheet 10 is joined with the inner surface (bottom surface) of the side wall 8 with the front and rear sides of the holding sheet 10 reversed from the third embodiment.

In the second embodiment and the third embodiment, the surface of the holding portion 11 that opposes the intake passage 4 does not necessarily have to be coplanar with the surface of the bottom surface of the side wall 8 that opposes the intake passage 4.

In the second embodiment and the third embodiment, when the surface of the holding portion 11 that opposes the intake passage 4 is not coplanar with the surface of the bottom surface of the side wall 8 that opposes the intake passage 4, the joined portion 12 may be joined with the bottom surface of the recess 13.

The adsorbents 9 and the holding sheet 10 are arranged on the bottom surface (inner surface) of the lower side wall 8 of the two side walls 8. Instead, the adsorbents 9 and the holding sheet 10 may be arranged on an inner surface other than the bottom surface of the inner surfaces of the two side walls 8.

The fibrous portion 6 of the intake duct 2 is formed by joining the two edges of the upper side wall 8 in the radial direction of the fibrous portion 6 and the two edges of the lower side wall 8 in the radial direction of the fibrous portion 6 through thermal pressing. However, the edges may be joined with each other through ultrasonic welding instead of the thermal pressing.

Instead of the intake duct 2, the present invention may be applied to the air cleaner 3 or a duct located at the downstream side of the air cleaner 3 and connected to the air cleaner 3.

The present examples and embodiments are to be considered as illustrative and not restrictive, and the invention is not to be limited to the details given herein, but may be modified within the scope and equivalence of the appended claims.

The invention claimed is:

1. An intake system component comprising:
   a side wall that forms an intake passage, wherein the side wall is formed by a fibrous body including base material fibers and binder fibers that bond together the base material fibers, and the binder fibers have a lower melting point than the base material fibers; and
   a holding sheet arranged on an inner surface of the side wall, wherein the holding sheet is formed in the same manner as the side wall by a fibrous body including the base material fibers and the binder fibers that bond together the base material fibers, and the binder fibers have a lower melting point than the base material fibers, wherein
   the holding sheet includes
      a holding portion that holds an array of a plurality of adsorbents that adsorbs a fuel component, wherein the holding portion does not pass between the array to contact the side wall, and
      a joined portion located around the holding portion and joined with the inner surface of the side wall by the binder fibers.

2. The intake system component according to claim 1, wherein
   the side wall is one of a plurality of side walls,
   the side walls are arranged in a radial direction of the intake passage and joined with each other by the binder fibers, and
   the holding sheet is arranged on the inner surface of one of the side walls.

3. The intake system component according to claim 1, wherein
   the inner surface of the side wall includes a recess, and
   the holding sheet is arranged so that the adsorbent held by the holding portion is located in the recess.

4. The intake system component according to claim 3, wherein
   the inner surface of the side wall includes a peripheral portion located around an opening of the recess,
   the joined portion is joined with the peripheral portion by the binder fibers in a state in which the adsorbent held by the holding portion is located in the recess, and
   a surface of the holding portion that opposes the intake passage is coplanar with a surface of the joined portion that opposes the intake passage.

5. The intake system component according to claim 1, wherein
   the holding portion of the holding sheet includes a front surface sheet and a rear surface sheet that are adhered to each other, and
   the adsorbent is held between the front surface sheet and the rear surface sheet.

\* \* \* \* \*